United States Patent
Zhang et al.

(10) Patent No.: US 8,720,930 B2
(45) Date of Patent: May 13, 2014

(54) COLLISION PROTECTION STRUCTURE

(71) Applicant: Suzhou Eagle Electric Vehicle Manufacturing Co., Ltd., Suzhou (CN)

(72) Inventors: Xueqing Zhang, Suzhou (CN); Jian Yan, Suzhou (CN)

(73) Assignee: Suzhou Eagle Electric Vehicle Manufacturing Co., Ltd., Suzhou (CN)

( * ) Notice: Subject to any disclaimer, the term of this patent is extended or adjusted under 35 U.S.C. 154(b) by 0 days.

(21) Appl. No.: 13/944,714

(22) Filed: Jul. 17, 2013

(65) Prior Publication Data

US 2013/0300086 A1 Nov. 14, 2013

Related U.S. Application Data

(63) Continuation of application No. PCT/CN2011/001126, filed on Jul. 8, 2011.

(30) Foreign Application Priority Data

Mar. 8, 2011 (CN) .......................... 2011 1 0054744

(51) Int. Cl.
*B62J 27/00* (2006.01)
(52) U.S. Cl.
USPC ...................................... 280/304.4
(58) Field of Classification Search
USPC ................ 280/304.3, 304.4, 727, 748, 751
See application file for complete search history.

(56) References Cited

U.S. PATENT DOCUMENTS

| | | | | |
|---|---|---|---|---|
| 1,473,956 A | * | 11/1923 | Eyre et al. ................. | 280/288.4 |
| 4,416,465 A | * | 11/1983 | Winiecki ................... | 280/290 |
| 4,427,214 A | | 1/1984 | Häggkvist | |
| 4,650,204 A | * | 3/1987 | Bothwell .................. | 280/304.3 |
| 4,798,399 A | * | 1/1989 | Cameron ................... | 280/756 |
| 6,773,028 B2 | | 8/2004 | Itabashi et al. | |
| 7,364,195 B2 | * | 4/2008 | Tsunoda et al. ............ | 280/751 |
| 8,333,398 B2 | * | 12/2012 | Oved et al. ................ | 280/304.3 |
| 2003/0160425 A1 | * | 8/2003 | Hyndman et al. ......... | 280/304.3 |

FOREIGN PATENT DOCUMENTS

| | | |
|---|---|---|
| CN | 2375550 Y | 4/2000 |
| CN | 2376415 Y | 5/2000 |
| CN | 201961443 U | 9/2011 |
| JP | 2003160078 A | 6/2003 |
| JP | 2007269288 A | 10/2007 |

* cited by examiner

*Primary Examiner* — Tony Winner
(74) *Attorney, Agent, or Firm* — Seed IP Law Group PLLC

(57) ABSTRACT

A collision protection structure to protect the shoulders includes a connecting member for fixedly attaching to a vehicle frame and an external shell positioned on the outer side of said connecting member. The collision protection structure also includes a protective foam disposed on the inner side of the external shell, a shoulder protection bracket fixedly attached to the connecting member, and a mounting bracket fixedly attached to the shoulder protection bracket. The mounting bracket is positioned between the protective foam and the shoulder protection bracket, said protective foam being fixedly arranged between the mounting bracket and the external shell. The present collision protection structure improves overall safety performance.

10 Claims, 5 Drawing Sheets

COLLISION PROTECTION STRUCTURE

BACKGROUND

1. Technical Field

The present disclosure relates to an electrical bicycle, and more particularly to a collision protection structure of the electrical bicycle.

2. Description of the Related Art

In daily lives, electrical bicycles have been widely used. Safety issues of the electrical bicycles have become people's highly focused problems. In order to assure the safety of the driver, the bottom of the electrical bicycle is usually provided with an anticollision metal rod. When the electrical bicycle collides against other objects, the metal rod will firstly be collided. Thereby, the driver who sits on the seat inside the metal rod will be prevented from getting injured.

Because the metal rod is installed adjacent to a foot pedal of the electrical bicycle, the upper body of the driver cannot be easily protected. The plastic shell located below the seat of some electrical bicycles is provided with an outward protruding configuration. Since the strength of the plastic shell is limited, when collision happens, the plastic shell is easily cracked and the body of the electrical bicycle is easily broken. As a result, the single plastic shell cannot effectively improve the safety performance of the electrical bicycle.

Hence, a new collision protection structure is desired to solve the above problem.

BRIEF SUMMARY

An embodiment of the present application provides a collision protection structure with improved safety performance.

An embodiment of a collision protection structure includes a connecting member for fixedly attaching to a vehicle frame and an external shell positioned outside of the connecting member. The collision protection structure of an embodiment also includes a protective foam disposed on an inner side of the external shell, a shoulder protection bracket fixedly attached to the connecting member, and a mounting bracket fixedly attached to the shoulder protection bracket. The mounting bracket is positioned between the protective foam and the shoulder protection bracket. The protective foam is fixed between the mounting bracket and the external shell.

The external shell may be of a tapered configuration. The external shell may include a flat anticollision surface and a pair of position posts protruding inside the anticollision surface. The pair of position posts may be spaced apart from each other. The protective foam may include a pair of position holes for mating with the position posts.

In an embodiment, each position hole is a counterbore. Each position post includes a screw hole. The collision protection structure further includes a pair of mounting posts inserted into the counterbores along a direction from the inside to the outside. The mounting posts are restricted by the counterbores. The mounting posts extend beyond the protective foam to fixedly rivet to the screw holes.

In an embodiment, the protective foam is columnar shaped and includes a plurality of restricting holes surrounding the position holes. The mounting bracket includes a plurality of restricting pieces extending perpendicularly to an exterior. The restricting pieces are inserted into and locked in the restricting holes.

In an embodiment, the protective foam includes a main surface and an external wall bent from peripheral edges of the main surface. The external wall is bent outwardly to surround the protective foam.

In an embodiment, the mounting bracket includes four fixing pieces bent inwardly from the main surface. A front portion of the shoulder protection bracket is clamped between the four fixing pieces.

In an embodiment, the front portion of the shoulder protection bracket includes a plurality of fixing holes. Each fixing piece may include a mounting hole corresponding to the fixing holes. The collision protection structure may further include a plurality of screws fixed in the mounting holes and the fixing holes.

In an embodiment, the collision protection structure further includes a shoulder protection cover inside which the shoulder protection bracket and the mounting bracket are positioned. The external shell protrudes outwardly beyond the collision protection structure.

In an embodiment, the connecting member is of a circular tube configuration. A rear portion of the shoulder protection bracket includes an arced recess configured to partly receive a peripheral surface of the connecting member. The connecting member is provided with a U-shaped handrail.

In an embodiment, the shoulder protection bracket is of a hollow configuration.

Comparing with the prior arts, an embodiment of the collision protection structure according to the present application is provided with an inner protective foam so that the overall collision protection structure has a certain deformation space. When collision happens, the collision protection structure is capable of buffering the impact force generated from the collision. As a result, the collision protection structure may not be easily broken. The overall safety performance of the present collision protection structure is greatly improved and thereby the driver can be better protected.

DETAILED DESCRIPTION

Figure 1:
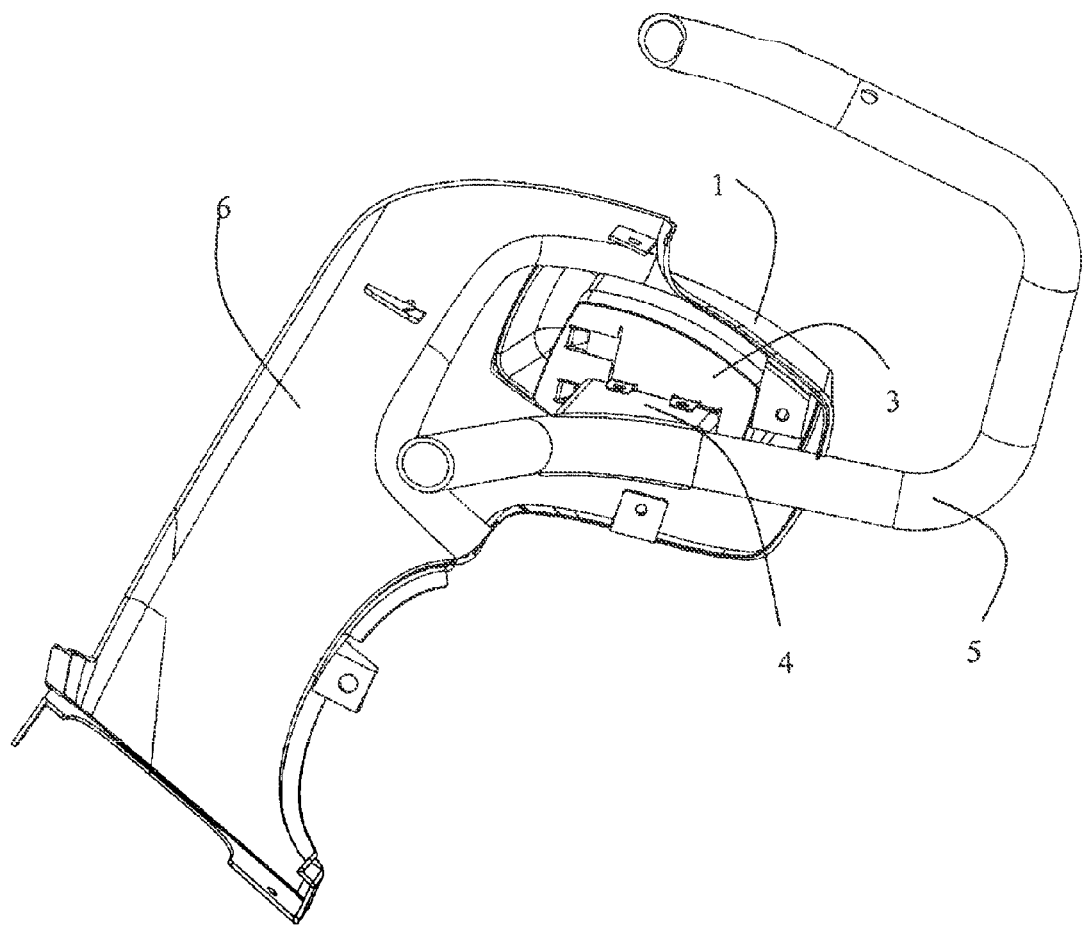
FIG. 1 is a perspective view of a collision protection structure in accordance with an illustrated embodiment.
Figure 2:
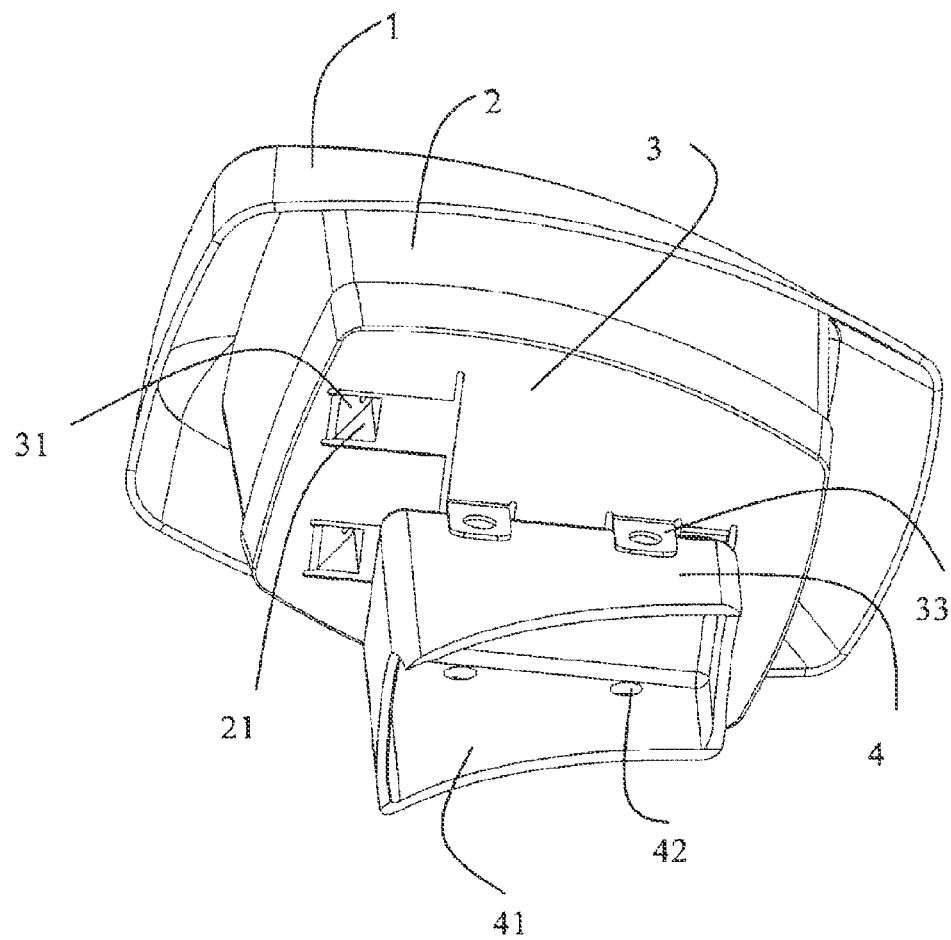
FIG. 2 is a partly perspective view of the collision protection structure with a connecting member and a shoulder protection cover removed therefrom.
Figure 3:
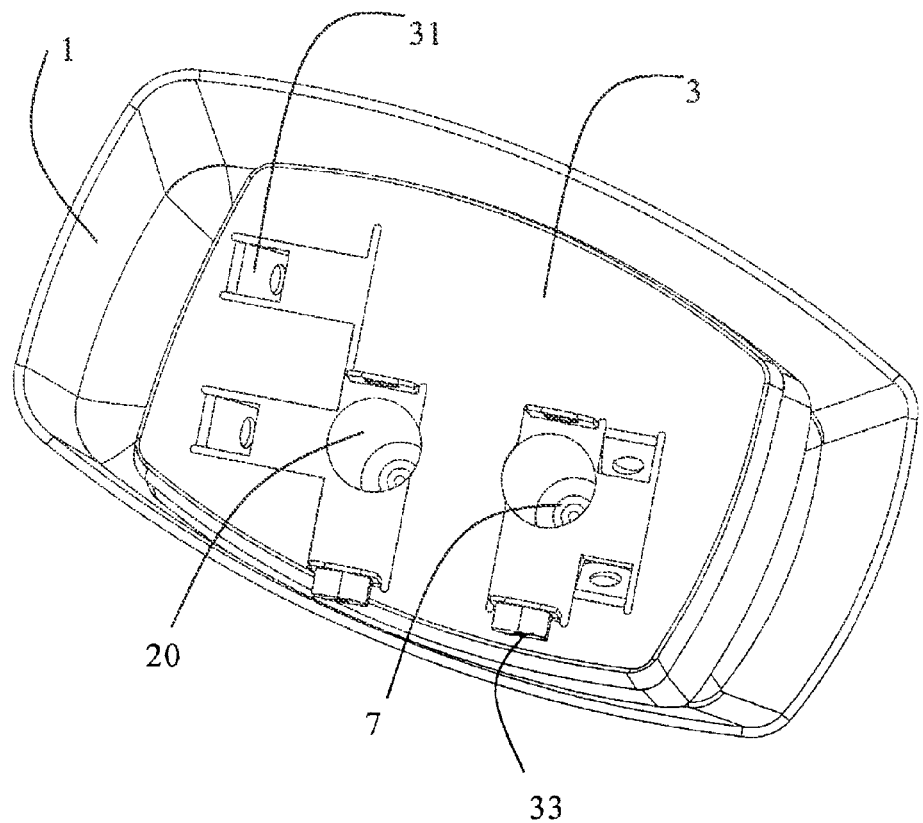
FIG. 3 is a partly perspective view of the collision protection structure with a shoulder protection bracket, a connecting member and a shoulder protection cover removed therefrom.

In order to better understand the object, the technical solution and the advantages of the present application, a detailed description of one or more example embodiments referring to the drawings will be described hereinafter.

Referring to FIGS. 1-5, the present application discloses a collision protection structure which is installed at lateral sides of a seat back of an electrical bicycle and positioned higher than the seat back for protecting the driver and the electrical bicycle. The collision protection structure is used for shoulder protection and includes an outmost external shell 1, a protective foam 2 disposed on an inner side of the external shell 1, a mounting bracket 3 for mounting the protective foam 2, a shoulder protection bracket 4, a connecting member 5 for soldering to a vehicle frame and a covering member 6. The covering member is a shoulder protection cover. The connecting member 5 is substantially of a circular tube configuration and is provided with U-shaped handrail for the passenger to put his hands when he rides on the electrical bicycle.

The external shell 1 is essentially of a tapered configuration. The external shell 1 includes a flat anticollision surface for resisting against the collision of external objects. The anticollision surface of the external shell 1 includes a pair of position posts 10 formed inside the anticollision surface. The pair of position posts 10 are spaced apart from each other and protrude inside the anticollision surface. Correspondingly, the protective foam 2 includes a pair of position holes 20 extending through an inner surface and an outer surface thereof along a front-to-back direction. Each position hole 20 is a counterbore which is divided into a first section adjacent to the inner surface of the protective foam 2 and a second section adjacent to the outer surface. The dimension of the first section is larger than the second section. The collision protection structure further includes a pair of mounting posts 7 inserted into the position holes 20 along a direction from the inside to the outside. Each mounting post 7 includes a cap and a front post wherein the dimension of the cap is larger than the front post. As a result, during mounting, the cap is restricted in the first section of the position hole 20 while the front post extends throughout the second section and beyond the outer surface of the protective foam 2 to fixedly rivet to screw holes of the position posts 10. Thereby, the external shell 1 and the protective foam 2 are securely fixed.

Figure 4:
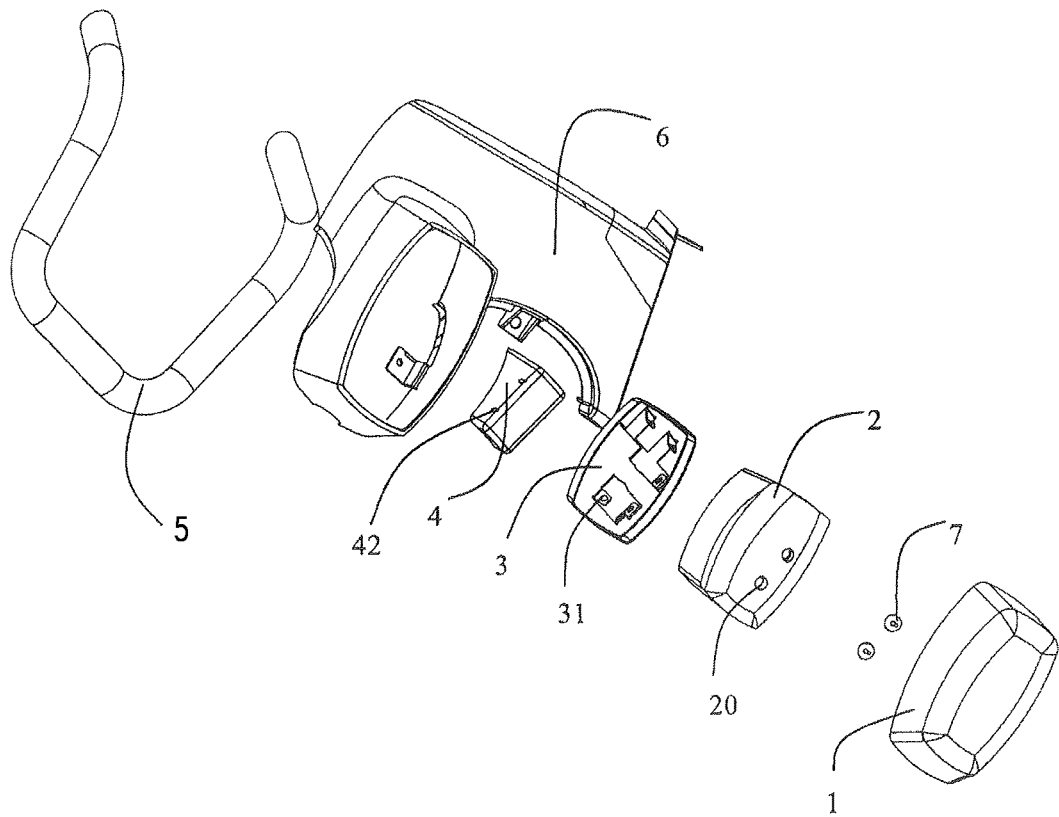
FIG. 4 is an exploded view of the collision protection structure.
Figure 5:
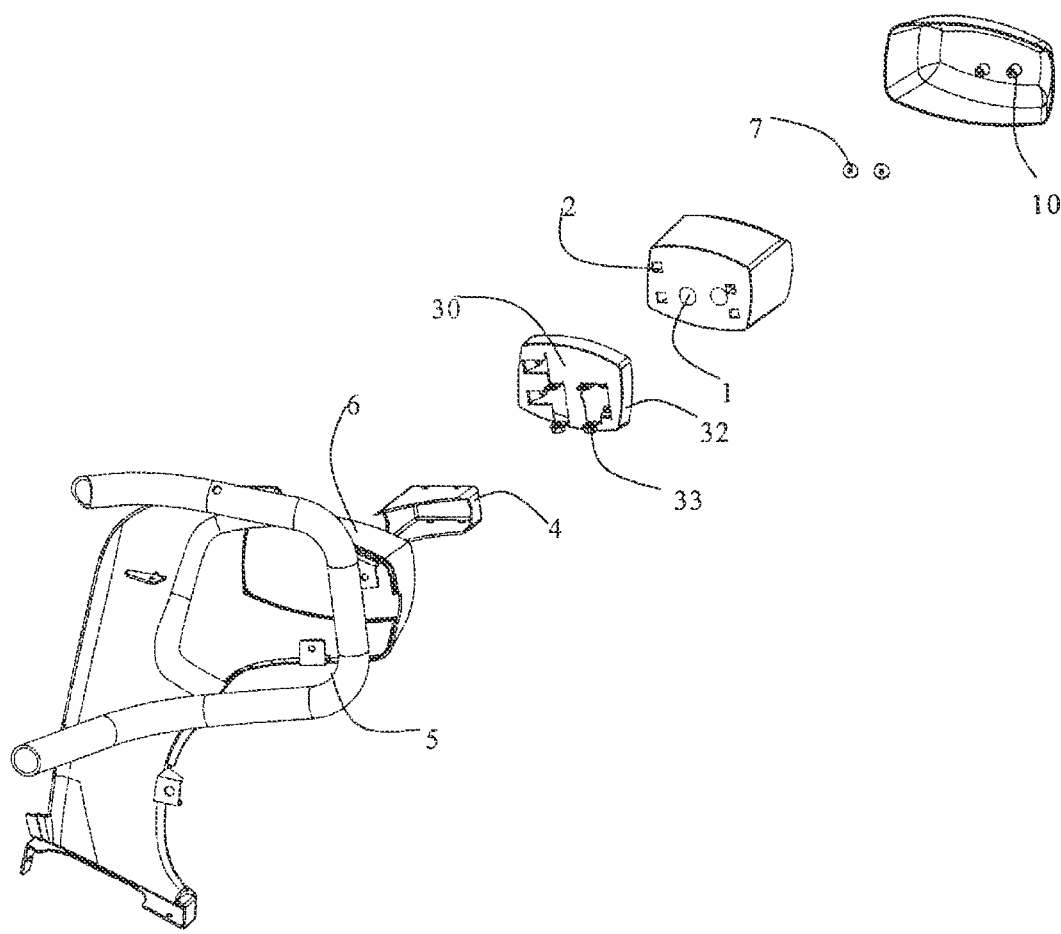
FIG. 5 is another exploded view of the collision protection structure.

Referring to FIGS. 4 and 5, the protective foam 2 is columnar shaped and includes four restricting holes 21 (see FIG. 2) surrounding the position holes 20. Correspondingly, the mounting bracket 3 includes four restricting pieces 31 extending perpendicularly to an exterior. The restricting pieces 31 are stamped outwardly from a main surface 30 of the mounting bracket 3 and are directly inserted into and locked in the restricting holes 21.

The mounting bracket 3 includes an external wall 32 bent from peripheral edges of the main surface 30. The external wall 32 is bent outwardly to surround the protective foam 2 for restricting free movement of the protective foam 2 along a direction perpendicular to an extending direction (e.g., a direction from the inside to the outside) of the position holes 20.

The mounting bracket 3 includes four fixing pieces 33 bent inwardly from the main surface 30 for fixing the shoulder protection bracket 4. The shoulder protection bracket 4 is made of aluminum and is of a hollow configuration. The shoulder protection bracket 4 includes a rear portion which includes an arced recess 41 configured to partly receive a peripheral surface of the connecting member 5. The connecting member 5 is a handrail of the electrical bicycle. During assembling, the arced recess 41 and the peripheral surface of the connecting member 5 are soldered together. The shoulder protection bracket 4 includes a front portion which includes a plurality of fixing holes 42. The front portion of the shoulder protection bracket 4 is clamped between the four fixing pieces 33. Each fixing piece 33 includes a mounting hole corresponding to the fixing holes 42. The collision protection structure further includes a plurality of screws fixed in the mounting holes and the fixing holes 42. The fixing pieces 33 and the shoulder protection bracket 4 may be directly soldered together for fixation.

The external shell 1 protrudes outwardly beyond the shoulder protection cover 6. The shoulder protection cover 6 is soldered to the vehicle frame. The mounting bracket 3 and the shoulder protection bracket 4 are positioned inside the shoulder protection cover 6 for restricting the mounting bracket 3 and the shoulder protection bracket 4.

When an embodiment of a collision protection structure according to the present application collides other objects, even if the electrical bicycle falls to the ground, the collision protection structure is capable of buffering the impact force generated from the collision. As a result, the body of the electrical bicycle, especially the ceiling glass of the electrical bicycle may not be easily broken.

In conclusion, the description of the above embodiment is only used for the understanding of the present application. It should be noted that, those skilled in the art may make many improvements and modifications to the present application without departing from the principle of the present disclosure, and these improvements and modifications also fall into the protection scope of the claims of the present application.

What is claimed is:

1. A collision protection structure comprising:
    a connecting member configured to fixedly attach to a vehicle frame;
    an external shell positioned outside of the connecting member;
    a protective foam disposed on an inner side of the external shell;
    a shoulder protection bracket fixedly attached to the connecting member; and
    a mounting bracket fixedly attached to the shoulder protection bracket, the mounting bracket being positioned between the protective foam and the shoulder protection bracket, the protective foam being fixed between the mounting bracket and the external shell.

2. The collision protection structure as claimed in claim 1, wherein the external shell is of a tapered configuration, the external shell comprising a flat anticollision surface and a pair of position posts protruding inside the anticollision surface, the pair of position posts being spaced apart from each other, the protective foam comprising a pair of position holes for mating with the position posts.

3. The collision protection structure as claimed in claim 2, wherein each position hole is a counterbore, each position post comprising a screw hole, the collision protection structure further comprising a pair of mounting posts inserted into the counterbores along a direction from the inside to the outside, the mounting posts being restricted by the counterbores, the mounting posts extending beyond the protective foam to fixedly rivet to the screw holes.

4. The collision protection structure as claimed in claim 2, wherein the protective foam is columnar shaped and comprises a plurality of restricting holes surrounding the position holes, the mounting bracket comprising a plurality of restricting pieces extending perpendicularly to an exterior, the restricting pieces being inserted into and locked in the restricting holes.

5. The collision protection structure as claimed in claim 4, wherein the protective foam comprises a main surface and an external wall bent from peripheral edges of the main surface, the external wall being bent outwardly to surround the protective foam.

6. The collision protection structure as claimed in claim 5, wherein the mounting bracket comprises four fixing pieces bent inwardly from the main surface, the shoulder protection bracket comprising a front portion which is clamped between the four fixing pieces.

7. The collision protection structure as claimed in claim 6, wherein the front portion of the shoulder protection bracket comprises a plurality of fixing holes, each fixing piece comprising a mounting hole corresponding to the fixing holes, the collision protection structure further comprising a plurality of screws fixed in the mounting holes and the fixing holes.

8. The collision protection structure as claimed in claim 1, further comprising a shoulder protection cover inside which the shoulder protection bracket and the mounting bracket are positioned, the external shell protruding outwardly beyond the collision protection structure.

9. The collision protection structure as claimed in claim 1, wherein the connecting member is of a circular tube configuration, the shoulder protection bracket comprising a rear portion which defines an arced recess configured to partly receive a peripheral surface of the connecting member, the connecting member being provided with a U-shaped handrail.

10. The collision protection structure as claimed in claim 1, wherein the shoulder protection bracket is of a hollow configuration.

* * * * *